United States Patent Office 3,305,525
Patented Feb. 21, 1967

3,305,525
METHOD FOR MAKING ORGANOSILICON POLYMERS
John C. Goossens, Scotia, N.Y., assignor to General Electric Company, a New York corporation
No Drawing. Filed May 3, 1965, Ser. No. 452,933
10 Claims. (Cl. 260—46.5)

The present invention relates to methods for making organosilicon polymers by effecting intercondensation of silano-containing organosilicon materials with silyamines.

Prior to the present invention, organopolysiloxane polymers suitable for making organopolysiloxane elastomers were generally made by the equilibration of mixtures of lower molecular weight materials, including organopolysiloxane cyclics, such as octamethylcyclotetrasiloxane, and organosiloxanes having terminal triorganosiloxy unit, such as trimethylsiloxy units. Although the equilibration method provides for a satisfactory organopolysiloxane gum, it has a variety of disadvantages. For example, equilibration requires the employment of elevated temperatures, such as up to 175° C., as well as extended heating periods. Those skilled in the art know that gums made by equilibration must be stripped of volatiles before being used. Volatiles can be as high as 14% by weight of the gum. In addition, equilibration does not provide for the production of high viscosity organosilicon polymers having chemically combined diorganosilhydrocarbon radicals and diorganosiloxy radicals. Also, organosilicon polymers made by equilibration have to be decatalyzed of equilibration catalyst to avoid reduced polymer stability.

The present invention is based on the discovery that certain silylamines having Y radicals attached to silicon by a silicon-nitrogen linkage, where Y is a monovalent amine radical selected from —NRR′ and a heterocyclic amine, R is selected from alkyl and cycloalkyl radicals, and R′ is selected from hydrogen and R radicals, can react with silanol-containing organosilicon materials to provide for the production of elastomer-forming organosilicon gums. For example, there is provided by the method of the present invention organopolysiloxane gums and high viscosity organosilicon polymers consisting essentially of chemically combined organosiloxy units and silhydrocarbon units. These elastomer-forming polymers are substantially free of volatiles and have a viscosity of at least 500,000 centipoises at 25° C. Molecular weight build-up of silanol-containing organosilicon materials can be achieved by the method of the invention without the employment of either equilibration catalyst or extended heating periods at elevated temperatures.

There is provided by the present invention, a method for making high viscosity organosilicon polymers substantially free of volatiles, which comprises mixing together at a temperature in the range of between 0° C. to 200° C., (A) a difunctional silyamine with (B) a silanol-contaning organosilicon material, until the resulting mixture achieves a viscosity of at least 500,000 centipoises at 25° C., where (A) has the formula, (1)     $YSiR''_2Z$ and Z is a member selected from Y, and $(OSiR'''_2)_n OSiR''_2Y$ and (B) is a member selected from, (a) a mixture consisting essentially of a monofunctional silyamine $R''_3SiY$, and a silanol-terminated diorganopolysiloxane consisting essentially of chemically combined diorganosiloxy units of the formula, (2)     $R'''_2SiO$ (b) A mixture consisting essentially of said silanol-terminated diorganopolysiloxane of (a), and a silanol-containing organopolysiloxane consisting essentially of chemically combined units of Formula 2 having a terminal unit selected from the class of $R'''_3SiO_{0.5}$, and $R'''_3SiO_{0.5}$, and (c) A mixture consisting essentially of a silanol-terminated organosilicon material consisting essentially of chemically combined units of Formula 2 and $R'''_2SiGSiR'''_2O$ units and silanol-containing organosilicon material consisting essentially of chemically combined units of Formula 2, $R'''_2SiGSiR'''_2O$ units and a terminal unit shown by (b), where A is utilized in combination with (B) in an amount sufficient to provide for at least one mole of Y radicals of (A), per mole of silanol radicals of (B), where said organosilicon polymers have a ratio of the sum of R″ and R‴ radicals per silicon atom of about 1.95 to 2.001, Y is previously defined, n is an integer equal to from 5 to 1,500, inclusive, R, R′, are as defined above, R″ is selected from monovalent hydrocarbon radicals and halogenated monovalent hydrocarbon radicals, R‴ is selected from R″ radicals and cyanoalkyl radicals, and G is a divalent hydrocarbon radical selected from arylene radicals, such as phenylene, tolylene, naphthylene, etc.; alkylene radicals, such as methylene, ethylene, trimethylene, etc.

Radicals included by R and R′ of the above formulae are hydrogen and alkyl radicals such as methyl, ethyl, propyl, butyl, pentyl, hexyl, heptyl, octyl, etc.; cycloalkyl such as cycloheptyl, cyclohexyl, etc. Radicals included by R″ are aryl radicals and halogenated aryl radicals, such as phenyl, chlorophenyl, xylyl, tolyl, etc.; aralkyl radicals such as phenylethyl, benzyl, etc.; aliphatic, haloaliphatic, and cycloaliphatic such as alkyl, alkenyl, cycloalkyl, haloalkyl, including methyl, ethyl, propyl, butyl, pentyl, hexyl, heptyl, octyl, etc., cyclohexyl, fluoropropyl, fluorobutyl, etc. Radicals included by R‴ are all of the R″ radicals and cyanoalkyl radicals, such as cyanoethyl, cyanopropyl, cyanobutyl, etc. In the above formulae, where R, R′, R″, R‴, and G can represent more than one radical; these radicals can be all the same or any two or more of the aforementioned radicals, respectively.

A method for making some of the silyamines which can be employed in the practice of the invention are shown by Johannson Patent 2,429,883. There are included for example, monofunctional silylamides, such as dimethylaminotrimethylsilane, dimethylaminodimethyl-(gamma-chloropropyl)silane, diethylaminodimethylphenylsilane, t-butylaminotrimethylsilane, ethylaminodimethylcyclohexylsilane, cyclohexylaminodimethylvinylsilane, diethylamino-tri-n-butylsilane, dimethylphenylmorpholinosilane, trimethylpiperidinosilane; difunctional silyamine such as bis-(dimethylamino)dimethylsilane, bis-methylamino)dimethylsilane, bis-(isopropylamino)dimethylsilane bis-(ethylamino)dimethylsilane, bis-(sec-butylamino) dimethylsilane, bis - (dimethylamino)methylvinylsilane, bis - (dimethylamino)methylphenylsilane, bis - (diethylamino)methylvinylsilane, bis-(isopropylamino)diphenylsilane, bis-(pyrrolidino)methylphenylsilane, dimethyldipiperidinosilane.

There are included by the silanol-containing organosilicon materials, polymers of the formula, (3)     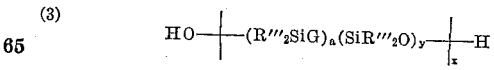

where R‴, and G are as defined above, a is a whole number equal to 0 or 1, and x is an integer which can be equal to 1 to 5, inclusive; when a is 0, x is equal to 1, and y is equal to n defined above, and preferably equal to 100 to 1,000 inclusive; when a and x are each equal to 1, y can be an integer equal to 1 to 100, inclusive.

Included by the silanol-containing organosilicon material of Formula 3 are silanol-terminated diorganopolysiloxanes. These materials can be made by standard hydrolysis procedures involving the hydrolysis of diorganodihalosilane of the formula, $$R'''_2SiX_2$$

where R''' is defined above and X is a halogen radical, for example, chloro, bromo, etc., or by the equilibration of cyclic polydiorganosiloxanes of the formula,

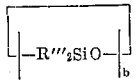

where $b$ is an integer equal to 3 to 8, inclusive. The resulting organopolysiloxane materials can be reverted to lower molecular weight silanol-terminated polydiorganosiloxanes to provide for ready removal of equilibration catalyst from the resulting product while eliminating the requirement of stripping. Controlled amounts of water can be added to achieve the desired final viscosity. Silanol-terminated diorganopolysiloxanes produced by the reversion of higher molecular weight organopolysiloxanes preferably have viscosities between 200 to 50,000 centipoises at 25° C.

Methods for making the silanol-containing organosilicon polymers included for Formula 3 which have chemically combined silhydrocarbon radicals are also well known. For example, such methods are shown by Sveda Patents 2,561,429, and 2,562,000. These polymers can have viscosities ranging from fluids to waxy materials depending upon the mole percent of silhydrocarbonsiloxy units. Preferably, silanol-containing silhydyrocarbonsiloxy-containing polymers have from 5 to 25 mole percent of silhydrocarbonsiloxy units, and from 95 to 5 mole percent of diorganosiloxy units. Included by the silanol-terminated diorganopolysiloxanes of Formula 3 are polymers consisting essentially of dimethylsiloxy units and copolymers of dimethylsiloxy units with one or more members selected from diphenylsiloxy units, methylphenylsiloxy units, methylcyanoethylsiloxy units, methyltrifluoropropylsiloxy units, etc. Minor amounts of phenylsiloxy and methylsiloxy units also can be present.

In particular instances, silanol-containing organopolysiloxane of the formula, (4) $\qquad R'''(R'''_2SiO)_mH$ can be utilized in combination with the silanol-containing organosilicon materials of Formula 3 in amounts effective to provide for organopolysiloxane gums having a ratio of the sum of R and R''' radicals of from 1.95 to 2.001, where R and R''' are as defined above, and $m$ is an integer equal to at least 3 and up to 1,000, inclusive. The silanol-containing organosilicon materials of Formula 4 can be made by equilibrating a mixture of from .01 to 20 mole percent of $R'''_3SiO_{0.5}$ units, and 80 mole percent to 99.9 mole percent of $R'''_2SiO$ units. The silanol-containing organopolysiloxane of Formula 4 also can contain from 0.02 to 8% by weight of hydroxy radicals attached to silicon, based on the total weight of silanol-containing organopolysiloxane. In addition, these materials can have viscosities up to 50,000 centipoises at 25° C.

The organopolysiloxane polymers or gums that can be made in accordance with the practice of the invention consist essentially of chemically combined units of Formula 2. These gums can have viscosities between 500,000 centipoises at 25° C., to as high as 650 million centipoises at 25° C. Some of these organopolysiloxane gums can be employed in applications similar to the polymers shown by Agens Patent 2,448,756, Sprung et al. Patent 2,448,556, Marsden Patent 2,521,528, etc., all assigned to the same assignee as the present invention. The gums made in accordance with the invention also can be milled with from 30 to 300 parts of filler, per 100 parts of gum. Such fillers include reinforcing fillers such as fume silica, as well as extending fillers, such as titanium oxide, etc. In addition, conventional peroxide catalysts also can be incorporated. The organopolysiloxane gums made in accordance with the practice of the invention also can be further characterized by having terminal units of the formula, (5)

where R''' is defined above, and Z is a member selected from R'' and R''' as defined above. With respect to the organopolysiloxane gums made in accordance with the practice of the present invention, those consisting essentially of chemically combined dimethylsiloxy units can have molecular weights up to two million. The gums made in accordance with the invention contain less than 1.0% by weight, of volatiles, based on the weight of the gum.

For example, some of the gums which can be made in accordance with the practice of the inventon have the average formula,

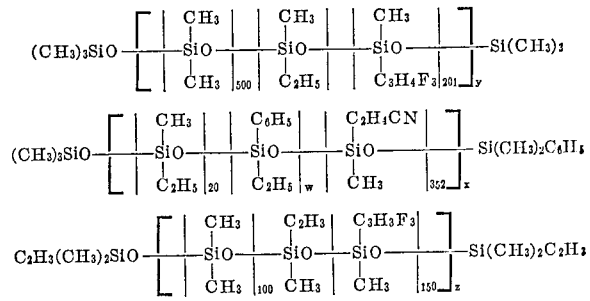

where $w$ is an integer equal to 1 to 10, inclusive, and $x$, $y$, or $z$ can have a value between about 5 to about 50, inclusive; the terminal units shown can be produced by the reaction of terminal silanol and $R''_3SiY$.

The process of the present invention can be practiced by mixing the difunctional silylamine and the silanol-containing organosilicon material at a temperature between 0° C. to 200° C. Preferably, a temperature between 20° C. to 170° C. is employed.

The order of addition of the various reactants is not critical. For example, in instances where monofunctional silylamine and difunctional silylamine are utilized together in combination with silanol-terminated diorganopolysiloxane, it is preferred to employ from 0.01 to 1 part of monofunctional silylamine, per part of difunctional silylamine. However, as little as from 0.001 part of monofunctional silylamine, per part of difunctional silylamine can be employed. In most instances, it is preferred to add the monofunctional silylamine to the silanol-terminated diorganopolysiloxane prior to the difunctional silylamine. In some instances addition of silylamine in the form of a mixture of monofunctional silylamine and difunctional silylamine can be employed. In certain instances, where functional silylamine is utilized having dimethylamino radicals attached to silicon, it can be added to the mixture of difunctional silylamine and silanol-terminated diorganopolysiloxane, as long as the viscosity of the mixture is below 50,000 centipoises at 25° C.

It is preferred to practice the method of the invention under substantially anhydrous conditions to preclude any undue hydrolysis of Y radicals of silylamine before intercondensation is achieved with silanol-containing organosilicon material. In instances where substantially anhydrous conditions are employed, rapid addition of excess silylamine can impede further intercondensation. However, the introduction of moisture will provide for further intercondensation by creating further silanol due to the hydrolysis of terminal Y radicals. Experience has shown that intercondensation is substantially retarded if an organic solvent is utilized. In order to facilitate stirring however, minor amounts of an insert organic solvent such as less than 10% by weight of the reaction mixture can be introduced after intercondensation has substantially progressed to reduce the viscosity of intercondensation product. For example, benzene, xylene, toluene, and the like can be used.

In instances where silylamine is utilized in amounts insufficient to provide for at least one Y radical per silanol radical of the silanol-containing organosilicon material, there generally remains unreacted silanol-containing organo-silicon material after intercondensation has been completed. Excess of silylamine, beyond the quantity required to effect intercondensation of silanol with silylamine radicals, such as in amounts sufficient to provide for from 1 to 5 Y radicals per silanol radical can provide for effective results.

Reactions are generally most conveniently performed at atmospheric conditions. However, pressures of below atmospheric can be utilized. Recovery of the desired gum can be readily achieved by allowing the mixture to achieve a maximum viscosity and then removing any unreacted material or by-products at a reduced pressure.

In order that those skilled in the art will be better able to practice the invention, the following examples are given by way of illustration and not by way of limitation. All parts are by weight.

*Example 1*

There was added 0.38 part of silylamine to 20 parts of a silanol-terminated polydimethylsiloxane having a viscosity of about 205 centipoises at 25° C. During the addition, the mixture was stirred and maintained at a temperature of about 60° C. The silylamine consisted of a blend of about 9 parts of bis-(dimethylamino)dimethylsilane per part of dimethylaminotrimethylsilane. After four hours, a gum was obtained having an intrinsic viscosity of 2 dl./g. in toluene at 25° C. This gum had a viscosity of about 450 million centipoises at 25° C.

A slab of the gum was heated for 45 minutes at 135° C. and about 15 mm. Based on its original weight, the gum lost less than 0.8% by weight of volatiles.

*Example 2*

There was added about 0.002 part of isopropylaminotrimethylsilane to 20 parts of a silanol-terminated polydimethylsiloxane having a viscosity of about 3500 centipoises at 25° C. After the mixture had stirred for about an hour there was added 0.260 part of bis-(isopropylamino)dimethylsilane. The mixture was allowed to stand for two additional hours at room temperature; it was then heated in the open for 4 hours at 75° C. There was obtained a polydimethylsiloxane having a viscosity of about 120 million centipoises at 25° C. Based on the procedure used in Example 1, it showed a loss of less than 1% by weight of volatiles.

*Example 3*

A mixture of 300 parts of a silanol-terminated polydimethylsiloxane having a viscosity of about 3600 centipoises at 25° C. and 5½ parts of silylamine was heated to a temperature of 60° C. The silylamine consisted of a mixture of about 15% by weight of dimethylaminotrimethylsilane, 28% by weight of bis-(dimethylamino)dimethylsilane, and 57% by weight of bis-(dimethylamino)methylvinylsilane. After 4 hours a gum was obtained having a viscosity of about 630 million centipoises at 25° C. Its intrinsic viscosity in toluene was 2.2 dl./g. Based on its method of preparation, the gum consisted of blocks of polydimethylsiloxane joined together by recurring methylvinylsiloxy units and terminated with trimethylsiloxy units. The gum lost less than 0.75% by weight volatiles following the procedure of Example 1.

One hundred parts of the above gum was milled with 30 parts of fumed silica and 2 parts of dicumyl peroxide. The resulting composition was heated at 320° F. for 10 minutes. A slab of the resulting cured product showed an average tensile of 1,005 (p.s.i.) and 375% elongation at break.

*Example 4*

Over a period of about 7 hours, 0.33 part of silylamine is added in small increments to a mixture of 8 parts of a silanol-terminated methyltrifluoropropylpolysiloxane having a viscosity of about 10,000 centipoises at 25° C., and 12 parts of a silanol-terminated polydimethylsiloxane having a viscosity of about 700 centipoises at 25 °C. During the addition, the mixture is stirred and maintained at a temperature of 60° C. The silylamine consists of about 99% by weight of bis-(dimethylamino)dimethylsilane and 1% by weight of dimethylaminotrimethylsilane. A hazy product is produced which is heated with stirring to 125° C. under a stream of dry nitrogen. The product is extracted with toluene; there is obtained a 75% yield of non-tacky gum. Based on method of preparation this gum is composed of recurring blocks of methyltrifluoropropylsiloxane and polydimethylsiloxane and terminated with trimethylsiloxy units.

The above gum is blended with fumed silica in a proportion of 30 parts of filler per 100 parts of gum. The resulting mixture is cured with about 2 parts of benzoyl peroxide. A sheet from the resulting milled mixture is press-cured at 320° F. for 30 minutes. The cured product has valuable elastomeric and insulating properties.

*Example 5*

There is added 0.002 part of morpholinotrimethylsilane to 10 parts of a silanol-terminated polydimethylsiloxane having a viscosity of about 3500 centipoises at 25° C. The resulting mixture is heated and stirred for about 1 hour at 65° C. There is then added to the mixture 0.270 part of bis-(pyrrolidino)methylphenylsilane. The mixture is heated at 65° C. and stirred for several hours. There is obtained a high molecular weight gum.

The gum is milled with fumed silica in a proportion of about 300 parts of filler, per 100 parts of gum. There is milled with the resulting blend about 2 parts of benzoyl peroxide. A slab from the resulting milled mixture is press-cured at 320° F. for 30 minutes. A cured product is obtained having valuable insulating and elastomeric properties.

*Example 6*

There is added at a temperature of 80° C., 2½ parts of bis-(dimethylamino)dimethylsilane to 100 parts of a silanol-terminated methylsiloxane consisting of a mixture of 90% by weight of a silanol-terminated polydimethylsiloxane and 10% by weight of a silanol-containing methylsiloxane composed of about .058 mole percent of chemically combined trimethylsiloxy units and 99.942 mole percent of dimethylsiloxy units and having a ratio of about 3½ silanol radicals attached to silicon per chemically combined trimethylsiloxy unit. After 1½ hours there is obtained a polydimethylsiloxane gum having terminal trimethylsiloxy units and a viscosity of about 380 million centipoises at 25° C.

A mixture of 100 parts of the above gum and 30 parts of fumed silica is milled along with 2 parts of benzoyl peroxide. A slab of the milled composition is press-cured at 160° C. for 30 minutes. The cured product shows valuable elastomeric and insulating properties.

*Example 7*

A mixture of 50 parts of a silanol-terminated polydimethylsiloxane having a viscosity of about 3500 centipoises at 25° C. and 0.008 part of diethylaminotrimethylsilane was stirred for about 1 hour at 100° C. There was added to this mixture 0.8 part of bis-(diethylamino)dimethylsilane. After the mixture was stirred for an additional hour at 100° C. a gum was produced having a viscosity of about 200 million centipoises at 25° C.

*Example 8*

There is added a mixture of 0.175 part of bis-(dimethylamino)dimethylsilane and 0.05 part of dimethylaminotrimethylsilane to 20 parts of a silanol-terminated polydimethylsiloxane having a viscosity of 15,000 at 25° C. The resulting mixture is stirred continuously for six hours at 0° C. There is obtained a polydimethylsiloxane gum having a viscosity of 100 million centipoises at 25° C.

*Example 9*

There are added 0.25 part of bis-(isopropylamino)-dimethylsilane and .04 part of dimethylaminotrimethylsilane to 20 parts of a silanol-terminated copolymer composed of chemically combined dimethylsiloxy units and diphenylsiloxy units having a viscosity of 5,000 centipoises at 25° C. The addition is performed at a temperature of 60° C. while the mixture is stirred. After 5 hours a gum is obtained having a viscosity of about 4 million centipoises at 25° C. Based on method of preparation the gum is composed of chemically combined dimethylsiloxy units, and diphenylsiloxy units and terminal trimethylsiloxy units.

*Example 10*

There are added in increments over a period of 6 hours, 219 parts of tetramethylsilphenylene-1,3-diol to a mixture of 360 parts of octamethylcyclotetrasiloxane and sufficient potassium hydroxide to provide for a concentration of 50 parts of catalyst per million parts of mixture. The temperature of the mixture is maintained at 160° C. during the addition. The crude product is readily decatalyzed with phosphoric acid. It is a silanol-terminated polymer composed of chemically combined tetramethylsilphenylenesiloxy units and dimethylsiloxy units having a viscosity of 1500 centipoises at 25° C.

A mixture of one hundred parts of the above silanol-terminated polymer, 2 parts of bis-(isopropylamino)-methylvinylsilane and 0.3 part of dimethylaminotrimethylsilane is heated for 2 hours at 160° C. There is obtained a gum having a viscosity greater than 500,000 centipoises at 25° C. Based on method of preparation, the gum is composed of about 25 mole percent of chemically combined tetramethylsilphenylenesiloxy units, 75 mole percent of dimethylsiloxy units and terminal trimethylsiloxy units.

Based on the above results, those skilled in the art know that the present invention provides a unique and advantageous method for making high molecular weight organosilicon gums having low volatiles. These gums can be employed in the same applications as gums produced by conventional equilibration methods requiring the employment of equilibration catalyst without the need for devolatilizing the gum. In addition, the subject invention has the additional advantage of providing for the production of high molecular block copolymers of silhydrocarbonsiloxane, polydiorganosiloxane, and organosilicon polymers having recurring chemically combined siloxy units with functional radicals, such as olefinically unsaturated hydrocarbon radicals attached to silicon.

While the foregoing examples have of necessity been limited to only a few of the very many variables within the scope of the present invention, it should be understood that the present invention covers a much broader class of organosilicon gums formed by mixing difunctional silylamine of Formula 1 with a silanol-terminated organosilicon material as previously defined. All of these materials are prepared by methods specifically illustrated in the examples above and described further in the foregoing description of the present invention.

What I claim as new and desire to secure by Letters Patent of the United States is:

1. A method for making organosilicon gums substantially free of volatiles which comprises (1) mixing together at a temperature in the range of between 0° C. to 200° C. under substantially anhydrous conditions, and in the substantial absence of an inert organic solvent, (A) a difunctional silylamine and (B) a silanol-containing organosilicon material and (2) allowing said mixture of (1) to achieve a viscosity of at least 500,000 centipoises at 25° C., where (A) is a member selected from the class consisting of a silylamine of the formula, $$YSi(R'')_2Y$$

and a silylamine terminated polydiorganosiloxane of the formula, $$YSiR''_2(OSiR''')_nOSiR''_2Y$$

having a viscosity in the range of between 200 centipoises to 50,000 centipoises at 25° C., and (B) is a member selected from the class consisting of
 (a) a mixture consisting essentially of a silanol-terminated organosilicon polymer, and a member selected from the class consisting of a monofunctional silylamine of the formula, $$R''_3SiY$$

and (b) a mixture consisting essentially of said silanol-terminated organosilicon polymer and a silanol-containing organosilicon polymer having a terminal unit selected from the class consisting of $R''_3SiO_{0.5}$ and $R'''_3SiO_{0.5}$, where said silanol-terminated organosilicon polymer is a member selected from the class consisting of
  (i) diorganopolysiloxane consisting essentially of chemically combined $R'''_2SiO$ units,
  (ii) organosilicon polymer consisting essentially of $R'''_2SiO$ units chemically combined with $R'''_2SiGSiR'''_2O$ units, and
  (iii) a mixture of (i) and (ii), and said silanol-containing organosilicon polymer of (b) has said terminal unit chemically combined with organosilicon units selected from the class consisting of $R'''_2SiO$ units, $R'''_2SiGSiR'''_2O$ units and mixtures thereof, where (A) is utilized in combination with (B) in an amount sufficient to provide for a mixture having at least one mole of Y radicals of (A), per mole of silanol radicals of (B), where Y is a monovalent amine radical attached to silicon by a silicon-nitrogen linkage and selected from the class consisting of —NRR' and a heterocyclic amine radical, R is selected from alkyl radicals and cycloalkyl radicals, R' is a member selected from the class consisting of hydrogen and R radicals, R'' is a member selected from the class consisting of monovalent hydrocarbon radicals and halogenated monovalent hydrocarbon radicals, R''' is a member selected from the class consisting of R'' radicals and cyanoalkyl radicals, G is an arylene radical, n is an integer equal to from 5 to 1,500, inclusive, and said organosilicon gums have terminal radicals selected from the class consisting of $(R'')_3SiO_{0.5}$ and $(R''')_3SiO_{0.5}$, and a ratio of the sum of R'' and R''' radicals to silicon of about 1.95 to 2.001.

2. A method in accordance with claim 1, where said difunctional silylamine is a member selected from the class consisting of $$RR'NSi(R'')_2(OSiR''')_nOSi(R'')_2NR'R$$

and said monofunctional silylamine has the formula, $$R'''_3SiNR'R$$

where R is selected from the class consisting of alkyl radicals and cycloalkyl radicals, R' is a member selected from the class consisting of hydrogen and R radicals, R'' is a member selected from the class consisting of monovalent hydrocarbon radicals and halogenated monovalent hydrocarbon radicals, R''' is a member selected from the class consisting of R'' radicals and cyanoalkyl radicals, and n is an integer equal to from 5 to 1,500, inclusive.

3. A method in accordance with claim 2, where the silanol-terminated organosilicon polymer utilized with said difunctional silylamine is a diorganopolysiloxane consisting essentially of chemically combined diorganosiloxy units of the formula, R'''₂SiO where R''' is a member selected from the class consisting of monovalent hydrocarbon radicals, halogenated monovalent hydrocarbon radicals and cyanoalkyl radicals.

4. A method in accordance with claim 2, where the silanol-terminated organosilicon polymer utilized with said difunctional silylamine is an organosilicon polymer consisting essentially of chemically combined R'''₂SiO units and R'''₂SiGSiR'''₂O units, where R''' is a member selected from the class consisting of monovalent hydrocarbon radicals, halogenated monovalent hydrocarbon radicals and cyanoalkyl radicals, and G is an arylene radical.

5. A method in accordance with claim 2, where there is utilized from 0.001 to 1 part of said monofunctional silylamine, per part of said difunctional silylamine.

6. A method in accordance with claim 2, where said monofunctional silylamine is dimethylaminotrimethylsilane and said difunctional silylamine is bis-(isopropylamino)dimethylsilane.

7. A method in accordance with claim 2, where said monofunctional silylamine is dimethylaminotrimethylsilane, and said difunctional silylamine is a mixture of bis-(dimethylamino)methylvinylsilane, and bis(dimethylamino)dimethylsilane.

8. A method for making trimethylsiloxy-terminated methylpolysiloxane gums having low volatiles, which comprises (1) mixing together at a temperature in the range of between 0° C. to 200° C., under substantially anhydrous conditions and in the substantial absence of an inert organic solvent, (A) an aminosilane having dimethylamino radicals, and (B) a silanol-terminated dimethylpolysiloxane having a viscosity between 200 centipoises to 50,000 centipoises at 25° C., and (2) allowing the resulting mixture to achieve a viscosity of at least 500,000 centipoises at 25° C., where (A) is a mixture of dimethylaminotrimethylsilane and bis-(dimethylamino)dimethylsilane having from 0.001 part to 1 part of dimethylaminotrimethylsilane, per part of bis-(dimethylamino)dimethylsilane, and is utilized with (B) in an amount sufficient to provide for in said mixture of (2), at least 1 mole of dimethylamino-radicals, per mole of silanol radicals of (B) and a ratio of methyl radicals to silicon in said trimethylsiloxy-terminated methylpolysiloxane gums of from 1.95 to 2.001.

9. A method for making trimethylsiloxy-terminated methylpolysiloxane gums having low volatiles, which comprises (1) mixing together at a temperature in the range betwen 0° C. to 200° C. under substantially anhydrous conditions and in the substantial absence of an inert organic solvent (A) bis-(dimethylamino)dimethylsilane and (B) a silanol-containing methylsilicon material having a viscosity betwen 200 to 50,000 centipoises at 25° C., which consists essentially of a mixture of a silanol-terminated polydimethylsiloxane and a silanol-containing methylsiloxane consisting essentially of chemically combined dimethylsiloxy units and trimethylsiloxy units, and (2) allowing the resulting mixture to achieve a viscosity of at least 500,000 centipoises at 25° C., where (A) is utilized in an amount with (B) which is sufficient to provide for at least one dimethylamino radical of (A) per silanol radical of (B) in said mixture of (2) and a ratio of methyl radicals to silicon in said trimethylsiloxy-terminated methylpolysiloxane gums of from 1.95 to 2.001.

10. A method for making trimethylsiloxy-terminated organosilicon gums having low volatiles, which comprises (1) mixing together at a temperature in the range of between 0° C. to 200° C., under substantially anhydrous conditions and in the substantial absence of an inert organic solvent, (A) an aminosilane, and (B) a silanol-terminated organosilicon material consisting essentially of chemically combined tetramethylsilphenylenesiloxy units and dimethylsiloxy units and (2) allowing the resulting mixture to achieve a viscosity of at least 500,000 centipoises at 25° C., where (A) is a mixture of dimethylaminotrimethylsilane and bis-(isopropylamino)methylvinylsilane having from 0.001 part to 1 part of dimethylaminotrimethylsilane, per part of bis-(isopropylamino)methylvinylsilane, and is utilized in an amount sufficient to provide in said mixture of (2) for at least one mole of dimethylamino radicals and isopropylamino radicals, per mole of silanol radicals of (B), and a ratio of methyl radicals to silicon in said trimethylsiloxy-terminated methylpolysiloxane gums of from 1.95 to 2.001.

References Cited by the Examiner
UNITED STATES PATENTS

| 2,429,883 | 10/1947 | Johannson | 260—2 |
| 3,043,798 | 7/1962 | Boyer et al. | 260—46.5 |
| 3,133,110 | 5/1964 | Morehouse et al. | 260—46.5 |
| 3,146,251 | 8/1964 | Brown et al. | 260—26.5 |
| 3,202,634 | 8/1965 | Merker | 260—46.5 |

FOREIGN PATENTS 905,364  9/1962  Great Britain.

DONALD E. CZAJA, Primary Examiner.

LEON J. BERCOVITZ, Examiner.

M. I. MARQUIS, Assistant Examiner.